United States Patent Office 2,928,137
Patented Mar. 15, 1960

2,928,137
PROCESS FOR PREPARING POLYVINYL CHLORIDE FOILS OF LOW TURBIDITY

Josef Ferdinand Salhofer, Burgkirchen, Oberbayern, Germany, assignor to Farbwerke Hoechst Aktiengesellschaft vormals Meister Lucius & Brüning, Frankfurt am Main, Germany, a corporation of Germany No Drawing. Application August 6, 1957
Serial No. 676,489

Claims priority, application Germany August 10, 1956

3 Claims. (Cl. 18—57)

The present invention relates to a process for preparing hard foils of polyvinyl chloride which have a very low turbidity value.

It is known that polyvinyl chloride containing no plasticizers can be worked up into foils of various thickness by rolling on calenders. It has hitherto, however, not been possible to prepare clear foils of a very low turbidity value. Foils obtained by rolling emulsion polymers are only more or less transparent and the turbidity values of foils of 200 µ in thickness are more than 3%, said values being determined by the DIN 53 490 method. This turbidity is caused by the emulsifier used in the polymerization process as well as by the other substances added in order to improve workability and by the mostly rough and uneven surface which is due to the particular kind of treatment. Up to now suspension polymers of polyvinyl chloride have only seldom been used in the manufacture of hard foils. The foils prepared therefrom according to the methods hitherto known are even more turbid than those obtained from emulsion polymers. Owing to the fact that they are free from electrolytes they are chiefly used in electrical technology since in this field turbidity is of no importance.

The present invention provides a process for preparing hard foils of a very low turbidity value from polyvinyl chloride, which process ensures the manufacture of foils that, at a thickness of 200 µ, have a turbidity value of less than 1%. The turbidity value is exactly defined according to DIN 53 490 and in case of a material of a homogeneous turbidity can be measured in layers of certain thickness by the method indicated there, the values obtained being reproducible.

I have found that a polymer of vinyl chloride free from plasticizers and obtained by suspension polymerization can be processed on a calender provided with highly polished, for example hard-chromed, discharge rollers at a temperature which will ensure that the polymer between the two discharge rollers attains such a state of plasticity that the polymeric mass accumulating at the discharge rollers, the so-called kneading mass, rotates within itself, a phenomenon which can also be observed in the treatment of polyvinyl chloride containing a great amount of plasticizer. To attain this degree of plasticity it is necessary that the discharge rollers should have temperatures superior to 190° C. and consequently superior to the temperatures hitherto applied. Since the high degree of temperature which is necessary is clearly indicated by the beginning of the rotation of the kneading mass between the discharge rollers, temperature can easily be controlled and kept at the appropriate degree.

By this method of operating, there are obtained hard foils free from pores and having the above indicated high degree of clarity. They could not be obtained by operating according to the known methods.

According to the experiences hitherto made in the processing of polyvinyl chloride free from plasticizer, the temperature was to be maintained below the plasticizing temperature because it was expected that polyvinyl chloride when heated to the plasticizing temperature would decompose and burn into the calender rolls during calendering and render them unserviceable.

In spite of the high temperatures applied, no decomposition of the material takes place in the process of the present invention.

The invention is based on the observation that foils prepared from emulsion polymers have a more or less pronounced turbidity owing to the emulsifier contained therein, and that it was for some other reason that the suspension polymers not containing such additives have hitherto yielded even more turbid foils. It was found that this fact was due to the insufficient decomposition of the polyvinyl chloride conglomerates in the suspension polymer. From this it followed that a perfect decomposition of the polyvinyl chloride conglomerates is only ensured when a polymer which is free from emulsifiers, i.e. a suspension polymer, is used and which must be heated until the thermoplastic state is attained.

The definition of the thermoplastic range may be gathered from the following diagram:

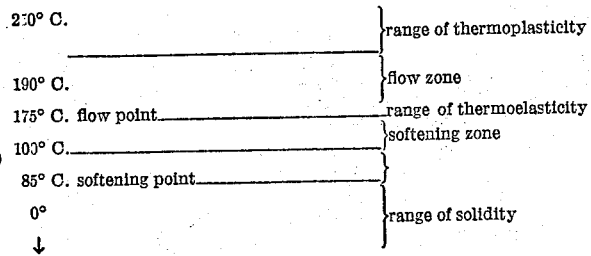

The process may be carried out by applying the calenders known, for the manufacture of hard foils. The foils prepared according to the process of the invention may be subjected in known manner to a subsequent heat treatment at temperatures between 180 and 280° C. They can then be subjected with success to a deep-drawing process. Just as the hard foils of polyvinyl chloride hitherto known the foils according to the present invention can be stretched at temperatures of between 80 and 160° C. with molecular orientation. During this process the values for strength and elongation change, the change in these values being of the same kind as that taking place when unstretched foils of emulsion polymer are stretched. The shrinkage of the hard foils prepared according to this invention corresponds to that of the hard foils hitherto known.

It is likewise possible to reduce the thickness of the foils prepared in accordance with the invention in a uniform manner by means of a drawing operation without stretching effect by extending them in one or more stages to the thickness desired as soon as they leave the slit between the calender rolls. If desired, the thermoplastic state may be maintained by means of an additional heating. The foils thus extended may subsequently be stretched in the range of thermal elasticity with molecular orientation and increase of tensile strength.

The process of the invention enables foils free from pores and having a thickness of no more than 5 µ to be obtained.

Obviously many modifications and variations of the present invention are possible in the light of the above teachings. It is, therefore, to be understood that within the scope of the appended claims the invention may be practiced otherwise than as specifically described.

I claim:
1. A process for preparing hard foils of polyvinyl chloride which have a very low coefficient of turbidity comprising the steps of forming in accordance with the suspension polymerization process a polyvinyl chloride polymer free of plasticizer, calendering the polymer with highly polished hard surfaces, and maintaining the temperature of the surfaces at least about 190° C. so that said polymer is maintained in a state of thermal plasticity whereby the kneading mass formed from the polymer rotates within itself.

2. A process as claimed in claim 1, wherein the foils, immediately after leaving the discharge roller, are reduced in thickness by a drawing operation without stretching effect.

3. A process as claimed in claim 1, wherein the foil is subsequently stretched in known manner with molecular orientation at temperatures of 80–160° C.

References Cited in the file of this patent

UNITED STATES PATENTS

| | | |
|---|---|---|
| 2,067,025 | Schmidt | Jan. 5, 1937 |
| 2,167,441 | Wick | July 25, 1939 |
| 2,279,901 | Domizi | Apr. 14, 1942 |